United States Patent [19]
Moebius

[11] 3,750,732
[45] Aug. 7, 1973

[54] LOCKING NUT
[76] Inventor: Kurt O. Moebius, P.O. Box 2339, Palos Verdes, Calif. 90274
[22] Filed: Jan. 29, 1971
[21] Appl. No.: 111,002

Related U.S. Application Data
[63] Continuation-in-part of Ser. Nos. 793,009, Jan. 22, 1969, abandoned, and Ser. No. 14,773, Feb. 26, 1970, abandoned, said Ser. No. 14,773, is a continuation of Ser. No. 771;780, Oct. 30, 1968, abandoned.

[52] U.S. Cl. .............................................. 151/2 A
[51] Int. Cl. ............................................. F16b 39/02
[58] Field of Search ................ 151/2 A, 21 B, 21 C

[56] References Cited
UNITED STATES PATENTS

| | | | |
|---|---|---|---|
| 798,828 | 9/1905 | Powell | 151/21 C |
| 1,298,469 | 3/1919 | De Young et al | 151/21 C |
| 1,389,927 | 9/1921 | Ball | 151/2 A |
| 2,090,040 | 8/1937 | Rosenberg | 85/35 |
| 2,355,253 | 8/1944 | Whitfield | 151/21 B |
| 2,381,110 | 8/1945 | Chandler | 151/21 R |
| 3,138,987 | 6/1964 | Wing | 85/50 |

FOREIGN PATENTS OR APPLICATIONS
881,308 11/1961 Great Britain .................. 151/2 A Primary Examiner—Edward C. Allen
Attorney—Lyon & Lyon

[57] ABSTRACT

A locking nut intended for engagement with a screw-threaded bolt shank having diametrically disposed flat sides, the nut being provided with a malleable cylindrical extension clearing the screwthreads of the bolt; the extension being capable of being squeezed inwardly from opposite sides into conformity with the flat sides of the bolt, and in doing so, causing the formation of an essentially S-shaped transition zone. A modification includes a transition of reduced thickness. A further modification includes a weakened portion in the transition zone for later severance to permit removal of the nut from the bolt.

9 Claims, 23 Drawing Figures

PATENTED AUG 7 1973

INVENTOR.
KURT O. MOEBIUS
BY
*Lyon & Lyon*
ATTORNEYS

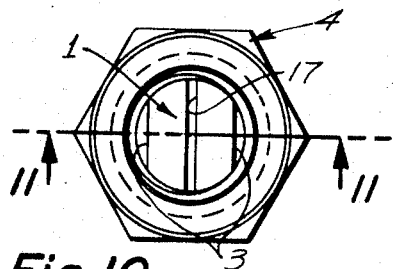
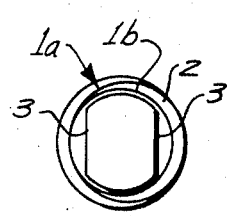
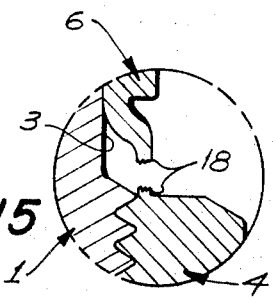
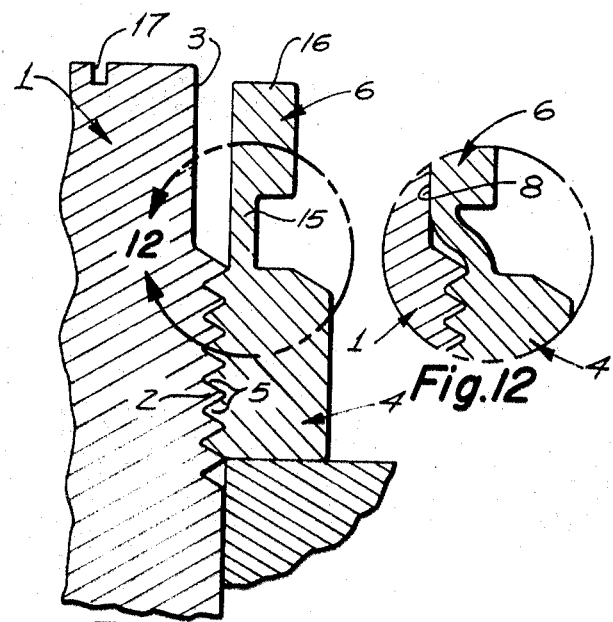
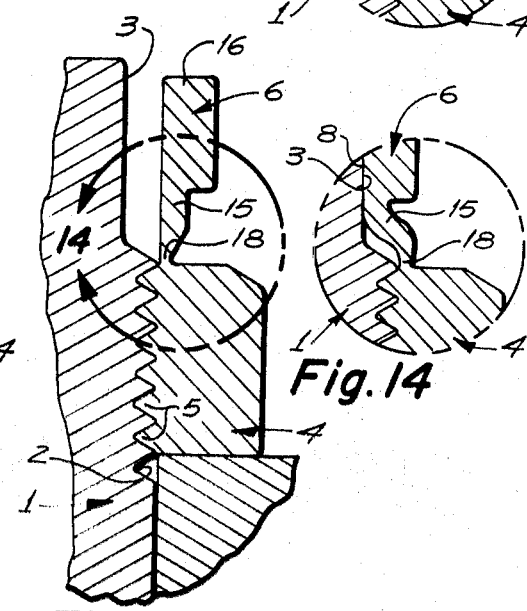
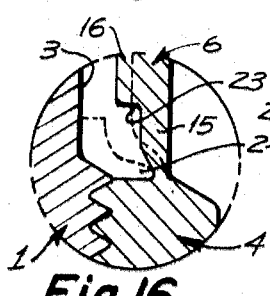
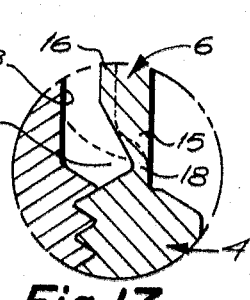
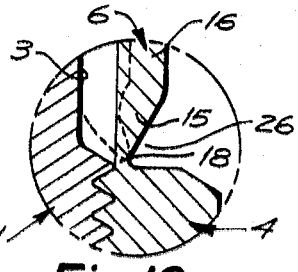
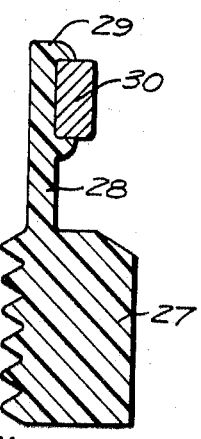
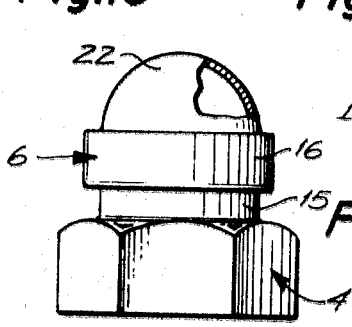
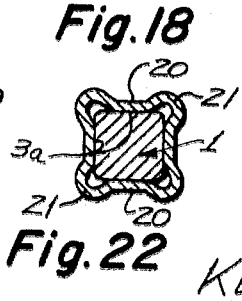

LOCKING NUT

This application is a continuation-in-part of Ser. No. 793,009, filed Jan. 22, 1969, and Ser. No. 14,773, filed Feb. 26, 1970, both now abandoned. Application Ser. No. 14,773 was a continuation of Ser. No. 771,780, filed Oct. 30, 1968, and now abandoned.

BACKGROUND OF THE INVENTION

The problem of a dependable locking nut has existed since the concept of a screwthreaded nut itself. One type which has been proposed from time to time is a screwthreaded nut having a portion which is deformable or mutilatable after insulation.

Although literally billions of screwthreaded nuts are currently used, the concept of a nut having a portion which is deformable or mutilatable after installation, is rarely used. Instead, predeformed nuts, locking washers, friction devices, and particularly where high dependability is required, and conditions permit its use, a castellated nut is used in conjunction with a cotter pin or wire passed through a hole provided in the bolt. The castellated nut is recognized as a positive locking device, much superior to the little more than token locking devices indicated above. Often, the castellated nut is recognized as the only acceptable fastener in spite of the extra cost of providing a cross hole in the bolt, the limitation of size, the wear and corrosion problems of a cotter pin, the chance of loss of the cotter pin in adjacent machinery, the problem of accessibility, and the problem of accurate torquing and positioning of the nut. These short comings are becoming more acute with the increasing sophistication of technology.

One of the reasons why the post deflected or mutilated nut has proven unsuccessful is due to the fact that one or more impacts or blows are needed to effect locking mutilation. It is impossible to accomplish this with any assurance whatsoever that the nut is dependably fastened, or that the bolt, nut or even the structure they secure has not been damaged in a manner to set up destructive stress concentrations. The period, indicated by the dates of most of the listed patents, during which the post deflected or mutilatable nut was proposed, modern highly stressed machinery, vehicles and the like had not come into being.

SUMMARY OF THE INVENTION

The present invention, although a locking nut of the distortable or mutilatable type, has not only overcome the deficiencies of earlier nuts of this type, but has incorporated advantages which make it remarkably suited for use under present conditions requiring maximum dependability.

More particularly, the locking nut comprising the present invention may be torqued to a precise load, thereupon the distortable portions may be pressed (not struck or hammered) by essentially equal opposing forces which place no appreciable biasing stress on the bolt or nut. This extremely strong locking action is accomplished by a sleeve of such length that substantial portions may be pressed into flat contact with the flattened areas provided on the bolt, and transition zones are provided between the sleeve and nut which eliminate regions of stress concentration.

It is not necessary, as in the case of a castellated nut, that the locking nut here considered be oriented in any predetermined manner with respect to the flattened portions of the bolt. If necessary, the associated mechanism may be tested to ensure proper location before the nut is secured. Also, if desired, the sleeve may be partially squeezed to effect a preliminary retention for test, then fully secured after test.

The locking nut of the present invention is adaptable to many conditions of use; for example, it may be made in a wide range of sizes, from miniature sizes below which other locking nuts are not suitable for use. Furthermore, it may be adapted for use in spaces inaccessible for use of conventional locking nuts.

The locking nut of the present invention may incorporate a sleeve having a transition zone or band of reduced thickness and a locking zone or band of increased thickness. In addition, the transition zone may have a weakened portion which, while dependably capable of withstanding the loads inherent in the use of the locking nut, may be arranged to sever under predetermined loads to permit piecemeal removal of the sleeve and the locking nut, should this be desired, and prevent reuse.

Furthermore, the locking nut of the present invention may be so arranged that its locking sleeve may be loosened by a tool arranged to apply opposed and balanced radial force in such a manner that the nut may be readily removed for reuse where conditions permit, as the sleeve may on replacement of the nut be again squeezed in conformity with the flattened sides of the bolt.

A further feature of the locking nut of the present invention lies in the fact that all tightening torque is converted into bolt tension; whereas, conventional nuts having friction operated retention means absorb a substantial and variable amount of torque energy in friction loss, reducing the torque available for conversion into bolt tension.

DESCRIPTION OF THE FIGURES

FIG. 10 is a plan view, showing a modified form of the locking nut fitted on a bolt and in its initial condition.

FIG. 11 is an enlarged fragmentary sectional view, taken through 11—11 of FIG. 10, showing the nut mounted on a bolt and in its initial condition.

FIG. 12 is an enlarged fragmentary sectional view, taken within Circle 12 of FIG. 11, showing particularly the transition portion between the locking band and the nut with the locking band in its locked condition.

FIG. 13 is an enlarged fragmentary sectional view, corresponding to FIG. 11, but showing a further modification of the locking nut as arranged for later severance of the locking sleeve to permit removal of the nut.

FIG. 14 is an enlarged fragmentary sectional view, taken within Circle 14 of FIG. 13, showing particularly the transition portion between the locking band and the nut with the band in its locked condition.

FIG. 15 is an enlarged fragmentary sectional view, corresponding to the portion within Circle 14 of FIG. 13, showing the nut after the locking portion has been severed therefrom in order to permit removal of the nut.

FIG. 16 is a fragmentary sectional view, corresponding to the portion within Circle 14 of FIG. 13; however, showing a further modified transition portion between the nut and its locking band.

FIG. 17 is a fragmentary sectional view, also corresponding to the portion within Circle 14 of FIG. 13, showing a further modified configuration of the transition portion.

FIG. 18 is also a fragmentary sectional view, corresponding to the portion within Circle 14 of FIG. 13, showing a still further modification of the transition portion.

FIG. 19 is a longitudinal sectional view, showing one lateral side of a modified form of the nut in which the nut is formed of plastic material.

FIG. 20 is a side view, showing a modified form of the locking nut which includes a dome or cap enclosing the end of the bolt.

FIG. 21 is a reduced sectional view, taken through the locking sleeve, showing a modified configuration of the locking sleeve when in its locking condition.

FIG. 22 is a sectional view, similar to FIG. 21, showing a modified bolt having four flat sides and a conforming locking sleeve.

FIG. 23 is an end view of a modified bolt.

Figure 1:
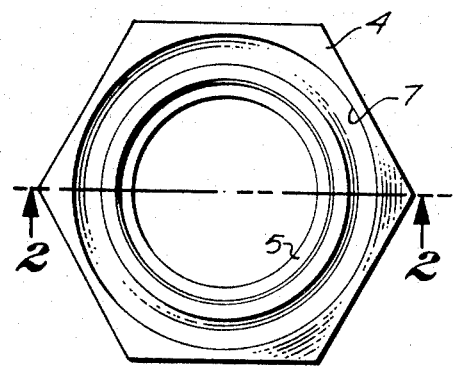
FIG. 1 is an enlarged plan view of a nut embodying the invention.
Figure 3:
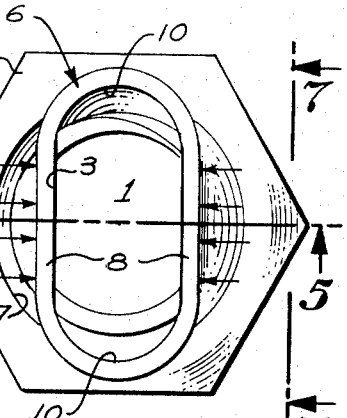
FIG. 3 is an enlarged end view of a bolt adapted for use with the nut shown in FIGS. 1 and 2.

Reference is first directed to FIGS. 1 through 7. The nut lock here illustrated includes a bolt 1, having screwthreads 2, which are interrupted near the end of the bolt by diametrically disposed flattened sides 3.

A nut 4 is provided, which is polygonal in aspect and provided with internal screwthreads 5, in the manner of a conventional nut. Extending axially from one end of the nut and integral therewith is an initially cylindrical sleeve 6, having an internal diameter which clears the screwthreads of a bolt dimensioned to fit the nut 4. Surrounding the sleeve 6 at its base end is an axially directed groove 7, formed in the nut 4. The groove is preferably semi-toroidal and serves to minimize the stress concentrations at the base end of the cylindrical sleeve.

Figure 4:
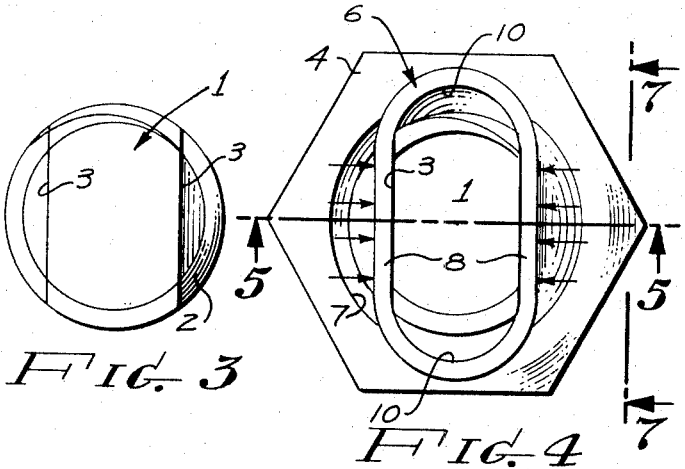
FIG. 4 is an enlarged end view of the nut and bolt, assembled and secured in their locked condition.
Figure 5:
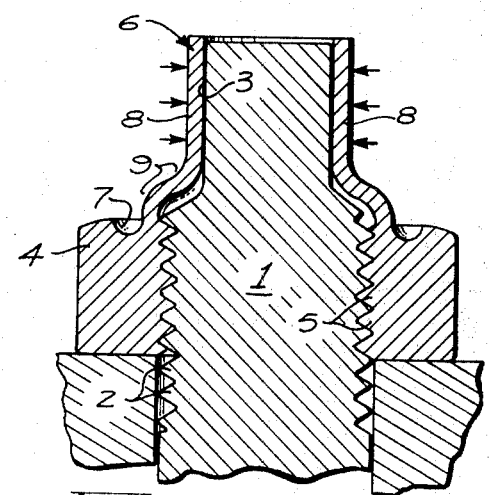
FIG. 5 is a sectional view thereof, taken through 5—5 of FIG. 4, with the bolt shown fragmentarily and also showing fragmentarily the member which receives the bolt.

The axial extent of the sleeve is preferably greater than the axial extent of the nut so that the extended portion of the sleeve may be transversely flattened to form flat and parallel side walls 8, conforming to the flattened sides 3 of a bolt, screwthreaded into the nut, as illustrated particularly in FIGS. 4 and 5.

The axial extent of the sleeve 6 is such that a transition zone 9 is formed between each flat side wall 8 and the nut. In each transition zone the sleeve forms an S-curve, the portions of which have substantial radius compared to the thickness of the sleeve, thereby minimizing stress concentrations in the sleeve in the course of forming the flat side walls 8.

When the sleeve 6 is flattened to form the side walls 8, the portions of the sleeve at right angles to the side walls 8 tend to extend diametrically, forming open loop portions 10, clearing the confronting portions of the bolt 1.

Figure 2:
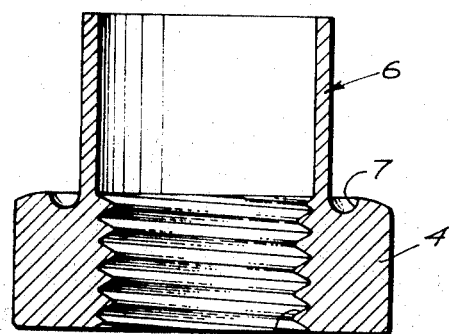
FIG. 2 is a sectional view thereof, taken through 2—2 of FIG. 1.

Operation of the nut lock is as follows:

The nut 4 and its sleeve 6 are initially in the condition shown in FIGS. 1 and 2, so that a bolt 1 may be screwthreaded into the nut until the flattened sides 3 protrude beyond the nut, as shown in FIG. 5. The side walls of the sleeve 6 are then pressed inwardly toward the flattened sides 3 along an axis perpendicular to the sides 3, as indicated by the arrows in FIGS. 4 and 5, so that flat side walls 8 are formed which are parallel to each other and conform closely to the flattened sides 3. It is essential, in order to ensure proper locking action, that the sleeve have sufficient axial length, that a substantial portion of the sleeve may be flattened against the bolt. It is also essential that there is provided an adequate transition zone 9.

Figure 6:
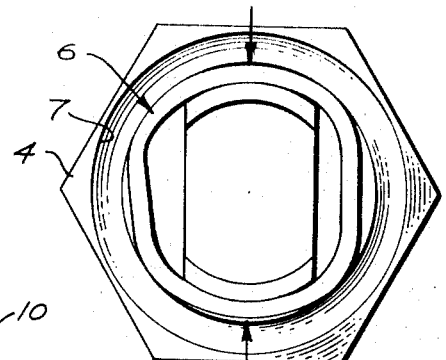
FIG. 6 is a plan or end view, similar to FIG. 4, illustrating the manner in which the nut is subsequently deformed to aid in removing the nut from the bolt.

Should it be desired to remove the nut from the bolt, opposed radially inward force may be applied at right angles to the flattened side walls 8, as indicated in FIG. 6. This has the effect of pressing the open loop portions 10 against the bolt 1 and tending to restore the sleeve to its original cylindrical condition. Complete restoration is not attained; however, the portions which previously formed the flat side walls 8 are forced away from the sides 3 sufficiently that when the nut 4 is subsequently turned with respect to the bolt, the interrupted screwthreads of the bolt have a caming effect to spread the sleeve sufficiently that the nut may be unscrewed from the bolt.

Figure 9:
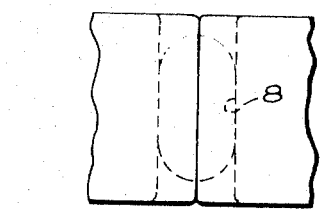
FIG. 9 is a plan view of the deforming jaws in their mutually engaged and closed position.
Figures 7, 8:
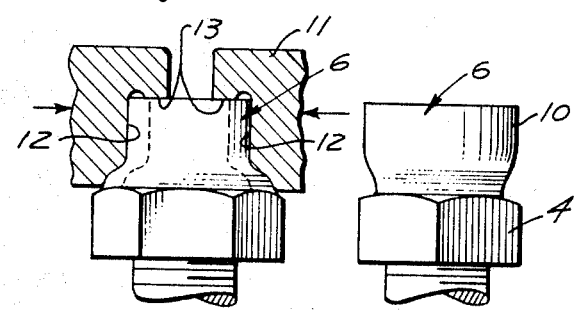
FIG. 7 is a reduced side view, taken from 7—7 of FIG. 4, showing the locked nut in its secured condition.
FIG. 8 is a similar side view, at right angles to FIG. 7, showing the nut in its initial condition and illustrating the manner in which a pair of deforming jaws operate to press the nut into locking engagement with the bolt.

The desired locking action, as well as the releasing action may be accomplished by use of standard pliers or vice grips. However, in order to provide the maximum locking effect, it is desirable to provide special jaws 11 on the pliers or vice grips. The jaws 11 have confronting flat sides 12, from which extend locating shoulders 13, intended to rest on the end of the sleeve 6, as shown in FIG. 8. Also, the shoulders 13 are of sufficient dimension that when brought into abutting relation, the flat or squeezing portions of the jaws will have pressed the side walls 8 into conformity with the flattened sides 3, as indicated in FIG. 9. Some pivotal movement of the jaws 11 is permissible, providing that when the jaws are in abutment, as shown in FIG. 9, the squeezing surface 12 will be parallel to each other. It is intended, of course, that in the event special jaws are used, there be a jaw set corresponding to each size of bolt and nut.

In order to restore the cylinder 6 more closely to its original circular shape, special jaws having semi-circular shape may be used.

By reason of the fact that the cylinder 6 has relatively thin walls, it may be readily annealed without reducing the hardness of the nut.

The configuration of the jaws may be such that they are guided by the upper surface of the nut or upper edge of the cylinder 6. If the end of the bolt should protrude above the sleeve, the shoulders 13 rest on the end of the bolt and prevent the lower portions of the jaws from forcing the sleeve wall against the bolt threads and avoid damage. Or, the lower portions of the jaws may be relieved, as indicated by 14, to permit proper shaping of the transition zones with minimal stress concentration.

While the terms "bolt" and "nut" have been used, the term includes any mutually engageable screwthreaded members, whether or not they are separate parts or incorporated in other mechanisms.

It will be observed that the relative orientation of the bolt and nut is infinite; thus, the nut does not need to occupy any preselected position relative to the bolt.

Reference is now directed to FIGS. 10, 11 and 12. In the modified construction here illustrated, the sleeve 6 includes a relatively thin wall transition band 15 and a locking band 16 of greater wall thickness.

The nut body 4 fits on the bolt 1 in the manner of the first described structure with the transition band 15 and locking band 16 confronting the flattened faces 3. The bolt 1 may be provided with an orientation slot 17 parallel with the opposed flattened faces 3.

The modified locking nut is secured in the manner of the first described structure. The relative wall thickness of the locking band and transition band is such that a pair of flat faced jaws may move across the end of the nut without engaging the transition zone; that is, the base of the transition zone does not protrude laterally beyond the flat surfaces of the locking band.

The force required to lock the sleeve 6 is divided between the force required to flatten the locking band 16 and the force required to angularly deform the transition band. If the two bands are of equal thickness, a substantially greater force is required to deform the transition band, than is required to deform the locking band. Thus, by reducing the wall thickness of the transition band and increasing the wall thickness of the locking band, a greater holding force is provided without the use of excessive deforming force.

Reference is now directed to FIGS. 13, 14 and 15. This construction is intended to permit removal of the nut by severing the locking sleeve from the nut. For this purpose, the base of the transition zone is provided with an annular groove forming a weakened region 18.

Installation is similar to the previous embodiments.

Should it be necessary to remove the locking nut, the nut 4 is turned with sufficient force to rupture the weakened region 18 while the locking band 16 is retained by its engagement with the flat faces 3. If necessary, the flattened portions 8 may be held with a tool while a second tool or wrench is applied to effect rotation of the nut body. This depends upon the thickness and strength of the locking band 16. In practice, it is desirable that the force required to rupture the weakened regions 18 be slightly less than the force which is intended to be applied to the nut in order to secure it in the first instance.

If an increased locking force is desired, the loop ends 10 beyond the flattened portions may be pressed toward each other to form shoulders 19, as shown in FIG. 21. The shoulders remove all back-lash and looseness from the assembly.

While it is preferred to provide a pair of diametrically opposed parallel flattened faces, in some instances the bolt may have four flattened faces, as indicated by 3a in FIG. 22. In this case, the locking band 16 is squeezed inwardly to form concave portions 20, joined by folded connecting portions 21.

It should be noted that it is unnecessay to orient the nut in any particular relation to the bolt; that is, some axial latitude in the position of the nut is permitted and when the nut is finally tightened, whatever portions of the locking band 16 are opposite the flattened faces 3 are the portions which are pressed inwardly. The orientation slot 17 is useful to determine the location of the faces 3 so that the squeezing pressure may be applied at the right locations.

If it is desired to provide a cover over the end of the bolt 1, a domed end 22 may extend upwardly from the locking band 16, as indicated in FIG. 20. In this case, the wall thickness of the domed end is such that the dome may be readily deformed as the locking band is pressed into conformity with the flattened faces 8 or 14, as the case may be.

While, as shown in FIGS. 11 through 15, the transition band 15 is formed by an external channel, the transition portion may be formed by an internal channel, designated 23 in FIG. 16, and the weakened region 18, if present, may be formed by an internal groove 24.

Still further, as shown in FIG. 17, an internal V-groove 25 may be formed in such a manner that its apex forms the weakened region 18, whereas one wall forms the transition band or zone. A similar result may be obtained by use of an external V-groove 26, as shown in FIG. 18.

In most instances, the removable locking nut is formed of metal, in which case the nut body may be heat treated differently than the transition and locking bands, so that the bands may be malleable while the threads of the nut have harder characteristics.

In many instances, it is desirable to form the locking nut from plastic materials, as shown in FIG. 19. More specifically, an internally screwthreaded plastic nut body 27 is provided, which is joined integrally to a transition band 28, and the band 28 is similarly joined to a locking band 29 of greater wall thickness. The locking band receives a metal locking ring 30, which may be located internally or externally, and provides the required holding strength when the locking band is pressed against the flattened sides of a nut.

While in most instances it is desirable that the locking band be readily removed when severed from the nut; hence, the flattened sides or faces 3 extend to the extremity of the bolt. If it is desired that the severed locking band be retained, the flattened sides 3 may terminate short of the end of the bolt. In this case, a redundant feature is provided; that is, the nut cannot be removed even if severed from the locking band unless the locking band is pressed 90° to its flattened sides, as indicated in FIG. 6, to restore it to approximately its initial round shape.

It should be noted that for adjustment purposes, the locking band may be squeezed slightly at first so that the nut may be removed yet be restrained by the locking band. Then, when final adjustment is made, the locking band may be pressed firmly against the bolt. The final flattened areas of the nut need not coincide with the areas initially squeezed.

It should be noted that in tightening the nut, the locking band moves freely about the bolt so that all the torque is converted into bolt load.

Reference is now directed to FIG. 23, which is an end view of a modified bolt 1a, in which its end 1b is reduced in diameter to a dimension equal to or slightly less than the root diameter of the screwthreads 2, and includes the opposed flat sides 3. This construction is used when it is intended that the nut be removable and damage to screwthreads is to be avoided.

As indicated in the preamble to the specification, the castellated nut secured by a cotter pin or wire is considered the most dependable locking nut available. It is much superior to the post deformed or mutilated type of nut which has an unpredictable and substantial variation is resistance to an unscrewing or disconnecting force. It is much superior to the predeformed type of nut in which the screwthreads are distorted to provide friction resistance when screwthreaded on a companion bolt.

The predistorted nut has a serious disadvantage. Data published by manufacturers of this type of nut show that the friction force to apply the predistorted nut drops substantially with reuse. For example, a ⅜ inch nut may require about 100 inch pounds force when initially applied; this force dropping to about 10 inch pounds if reused as little as five times. This means that initially, 100 inch pounds of torque must be considered as friction. In the example of the ⅜ inch nut and bolt, about 300 inch pounds is close to the safe upper limit. The usual torque wrench yields at a preset torque so that there is no means of determining how much was due to friction and how much was applied to tensioning the bolt. When the nut is first secured only 200 inch pounds is applied to the tensioning of the bolt, yet the bolt is capable of a 300 inch pound tension load. While 100 inch pounds has been absorbed in applying the nut, the amount of friction resistance to unscrewing the nut is a variable but in any case less than the 100 inch pounds lost tensioning the nut.

In contrast, the locking nut forming the subject of the present invention, has no mutilated screwthreads to offer resistance in screwing the nut so that all of the torque (less, of course, the negligible friction between meshing screwthreads) applied by the torque wrench is transferred into bolt tension. The sleeve may be predesigned so that, when squeezed against the flat sides of the bolt, its resistance to a loosening force is any selected safe value. It may, in the example of a ⅜ inch nut, be 100 inch pounds without subtracting from the tension load on the bolt. It may be substantially greater if desired. In prectice, it is predetermined to be in excess of the torque required to shear a cotter pin or wire so that the holding force is at least equal to or in excess of the holding force depended upon to secure a castellated nut. Still further, the sleeve is much more resistant to vibration forces or to corrosion forces which weaken a cotter pin or retaining wire. A further bonus lies in the fact that the sleeve is integral with the nut and hence cannot be lost in the machinery or adjacent equipment.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:

1. A fastener structure comprising in combination:
   a. a bolt having screwthreads and including an end portion including a pair of diametrically opposed flat sides;
   b. a nut having mating screwthreads and adapted to occupy a portion of the bolt adjacent but axially offset from the end portion;
   c. an integral locking sleeve having smooth surfaces and including a circular end clearing the screwthreads and joining integrally to the nut, a pair of first diametrically disposed transition zones continuing from the circular end and initially curving inward toward the flat sides of the bolt end portion, then curving toward a parallel relation until at least in line contact with the flat sides, and a pair of second diametrically disposed transition zones initially curving outwardly from the bolt end portion, then curving toward parallel relation clear of the bolt end portion.

2. A faster structure, as defined in claim 1, wherein:
   a. the sleeve continues axially along the bolt end portion with its diametrically opposed portions in essentially parallel relation to provide surface contact with the flat sides of the bolt end portion.

3. A fastener structure, as defined in claim 2, wherein:
   a. the region of the sleeve occupied by the transition zones has reduced wall thickness and the region of the sleeve continuing axially therefrom has increased wall thickness.

4. A fastener structure as defined in claim 2, wherein:
   a. the nut and sleeve are formed of plastic material;
   b. and the axially continuing portion includes a ring of malleable metal.

5. A faster structure as defined in claim 2, wherein:
   a. a deformable cap covers the extended end of the sleeve.

6. A fastener structure as defined in claim 1, wherein:
   a. the nut is provided with a semi-toroidal axially directed channel at the circular end of the sleeve.

7. A fastener structure, as defined in claim 1, wherein:
   a. the circular end of the sleeve at its juncture with the nut has a reduced wall thickness to form a weakened zone calculated to sever on application of a predetermined torsional stress between the sleeve and nut, thereby to permit subsequent piecemeal axial removal of the sleeve and nut.

8. A nut for locking engagement with a bolt having a pair of opposed flat regions depressed below its screwthreads, the nut comprising:
   a. a body formed of plastic material and having internal screwthreads dimensioned to screwthread on the bolt;
   b. an initially cylindrical sleeve formed of plastic material and connected integrally to the nut and extending axially therefrom in contiguous but clearing relation to the screwthreads of the bolt and adapted to occupy a position confronting the flat regions of the bolt, the walls of the sleeve being continuous and extending at least half the diameter of the sleeve;
   c. the walls of the sleeve being deformable to provide a pair of opposed transition zones adjacent the nut which curve in one direction from the nut portion, then in the opposite direction to the corresponding flat regions of the bolt, and a pair of opposed flat locking zones continuing from the transition zones and disposed in essentially surface contact throughout the width of the flat regions of the bolt to resist relative rotation of the bolt and nut;

d. and a metal locking band surrounding the locking zones.

9. A locking nut for use on bolts having at least one flat side at its extremity, said locking nut comprising:
   a. a nut body having internal screwthreads to receive said bolt;
   b. an integral circumferentially continuous sleeve extending axially from said nut body and having an inner surface initially clearing the bolt screwthreads, said sleeve including a transition band of a predetermined wall thickness, a locking band of uniform wall thickness greater than that of said transition band said locking band being deformable into conformity with the flat side of said bolt, and the contiguous axial end of said transition band being deformable therewith while the axial end of said transition band folds locally with respect to said nut body;
   c. said nut body and sleeve being formed of plastic material;
   d. and a ring of non-resilient metal incorporated in said locking band.

* * * * *